United States Patent [19]

Gallagher

[11] Patent Number: 5,240,138

[45] Date of Patent: * Aug. 31, 1993

[54] RINGLESS PAINT CONTAINER

[75] Inventor: Thomas A. Gallagher, Chagrin Falls, Ohio

[73] Assignee: Van Dorn Company, Cleveland, Ohio

[*] Notice: The portion of the term of this patent subsequent to Nov. 14, 2006 has been disclaimed.

[21] Appl. No.: 873,674

[22] Filed: Apr. 24, 1992

Related U.S. Application Data

[63] Continuation of Ser. No. 746,310, Aug. 14, 1991, abandoned, which is a continuation of Ser. No. 528,531, May 25, 1990, abandoned, which is a continuation-in-part of Ser. No. 335,566, Apr. 10, 1989, which is a continuation of Ser. No. 120,471, Nov. 13, 1987, Pat. No. 4,880,131.

[51] Int. Cl.$^5$ .............................................. B65D 41/00
[52] U.S. Cl. ................................................. 220/658
[58] Field of Search .......................... 220/656, 658, 669

[56] References Cited

U.S. PATENT DOCUMENTS

| | | |
|---|---|---|
| 1,128,076 | 2/1915 | Taliaferro . |
| 1,419,314 | 6/1922 | Sexton . |
| 1,434,831 | 11/1922 | Long . |
| 1,954,568 | 4/1934 | Kenny ................................ 220/42 |
| 1,997,291 | 4/1935 | Barroll ............................... 220/42 |
| 2,060,504 | 11/1936 | Kjellstrom .......................... 220/42 |
| 2,384,810 | 9/1945 | Calleson et al. ................... 220/658 |
| 3,056,525 | 10/1962 | Deinert ............................... 220/21 |
| 3,142,433 | 7/1964 | Balocca .............................. 229/51 |
| 3,170,590 | 2/1965 | Ullman ............................... 220/91 |
| 3,333,728 | 8/1967 | Burdick .............................. 220/60 |
| 3,383,006 | 5/1968 | Knize ................................. 220/42 |
| 3,553,419 | 1/1971 | Garver et al. ...................... 219/79 |
| 3,613,938 | 10/1971 | Westcott ............................ 220/44 |
| 3,721,365 | 3/1973 | Saunders ............................ 220/47 |
| 3,732,909 | 5/1973 | Rooke et al. ...................... 150/0.5 |
| 3,773,208 | 11/1973 | Curry ................................. 220/43 |
| 3,804,289 | 4/1974 | Churan .............................. 220/60 R |
| 3,809,284 | 5/1974 | Churan .............................. 220/60 |
| 3,814,277 | 6/1974 | LaCroce et al. .................... 220/42 C |
| 3,858,756 | 1/1975 | Fulton ............................... 220/306 |
| 3,878,963 | 4/1975 | Knize ................................. 220/66 |
| 3,883,036 | 5/1975 | Mahaffy et al. ................... 220/306 |
| 3,944,115 | 3/1976 | Moonan et al. .................... 220/355 |
| 3,954,178 | 5/1976 | Mason, Jr. ......................... 206/508 |
| 3,979,015 | 9/1976 | Arfert ................................ 220/307 |
| 4,051,951 | 10/1977 | Smith ................................ 206/508 |
| 4,054,229 | 10/1977 | Arfert ................................ 220/288 |
| 4,079,857 | 3/1978 | Crisci ................................ 220/306 |
| 4,083,468 | 4/1978 | Batchelor .......................... 220/234 |
| 4,090,004 | 5/1978 | Tebbutt et al. .................... 428/64 |
| 4,141,463 | 2/1979 | Smith ................................ 220/359 |
| 4,177,930 | 12/1979 | Crisci ................................ 220/284 |
| 4,194,645 | 3/1980 | Zabner et al. ..................... 220/306 |
| 4,220,254 | 9/1980 | Morton .............................. 220/354 |
| 4,228,916 | 10/1980 | Wiengardt ........................ 220/354 |
| 4,256,240 | 3/1981 | Woinarski ......................... 220/306 |
| 4,296,871 | 10/1981 | Andersson ........................ 220/306 |

(List continued on next page.)

FOREIGN PATENT DOCUMENTS

| | | |
|---|---|---|
| 170523 | 11/1974 | New Zealand . |
| 546674 | 1/1974 | Switzerland . |
| 1394866 | 5/1975 | United Kingdom . |
| 2119343 | 6/1983 | United Kingdom . |

Primary Examiner—Steven M. Pollard
Attorney, Agent, or Firm—Body, Vickers & Daniels

[57] ABSTRACT

An especially configured, ringless, container-lid design is disclosed having improved sealing characteristics applicable to paint containers for the consuming public. The rim portion of the container is provided with a tapered, especially shaped wall section terminating in a circular bead which is received in a sealing groove in the lid. The wall section is rigidized by a single protrusion in the form of a groove to prevent vertical collapse of the container. The design disclosed permits easy modification of the container for serially stacking thereof.

6 Claims, 6 Drawing Sheets

U.S. PATENT DOCUMENTS

| | | | |
|---|---|---|---|
| 4,311,238 | 1/1982 | Smith | 206/508 |
| 4,334,631 | 6/1982 | Ballester | 220/306 |
| 4,344,546 | 8/1982 | Dry | 220/320 |
| 4,363,404 | 12/1982 | Westphal | 206/508 |
| 4,376,493 | 3/1983 | Gall | 220/307 |
| 4,380,304 | 4/1983 | Anderson | 220/306 |
| 4,386,715 | 6/1983 | Morton | 220/354 |
| 4,387,828 | 6/1983 | Yates, Jr. | 220/284 |
| 4,421,247 | 12/1983 | Lombardo et al. | 220/354 |
| 4,428,498 | 1/1984 | Obey | 220/367 |
| 4,429,805 | 2/1984 | Letica | 220/306 |
| 4,513,872 | 4/1985 | Bull | 220/658 |
| 4,520,943 | 6/1985 | Nielsen | 220/281 |
| 4,632,272 | 12/1986 | Berenfield et al. | 220/324 |
| 4,676,392 | 6/1987 | Giggard et al. | 220/284 |
| 4,723,676 | 2/1988 | Kobayashi et al. | 215/301 |
| 4,723,681 | 2/1988 | Glerum | 220/72 |
| 4,742,932 | 5/1988 | Pedragosa | 220/74 X |
| 4,880,131 | 11/1989 | Gallagher et al. | 220/83 |
| 4,936,482 | 6/1990 | Gallagher et al. | 220/658 X |

RINGLESS PAINT CONTAINER

This is a continuation of Ser. No. 746,310 filed Aug. 14, 1991, now abandoned, now U.S. Pat. No. 4,936,482 dated Jun. 26, 1990, which in turn is a continuation of U.S. application Ser. No. 528,531 filed on May 25, 1990, now abandoned, which in turn is a continuation-in-part of U.S. application Ser. No. 335,566 filed Apr. 10, 1989, which in turn is a continuation of U.S. application Ser. No. 120,471 filed Nov. 13, 1987, which is now U.S. Pat. No. 4,880,131 dated Nov. 14, 1989.

This invention relates generally to metal containers with removable, resealable lids and more particularly to a ringless container in combination with a resealable lid.

The invention is particularly applicable to and suitable for use as a container for paints, varnishes, stains and the like sold to the consuming public and will be described with particular reference thereto. However, it will be appreciated to those skilled in the art that the invention has broader application and may be used as an air-tight container for any liquid or other substance which requires repeated on/off sealing applications of the container's lid.

BACKGROUND OF THE INVENTION

Conventional metal containers, particularly paint container and the like for use by the consuming public which are cylindrical in shape, typically comprise a container body, a bottom plate closing one end of the container, a ring which is secured to the open end of the container and a lid or a plug which fits into the ring to close the container. Reference may be had to U.S. Pat. No. 4,421,247 to Lombardo et al for a typical example showing the plug and ring construction and the fit therebetween.

The cylindrical container body is usually formed from a rectangular flat piece of sheet metal rolled into a cylinder with the sides joined together by a continuous soldered side seam and a circular bottom plate is then attached, usually by a crimped double seam, to one of the open ends of the cylinder. At the other end of the cylinder, an annular, grooved ring member is similarly attached. Various types of seams can be used and some container are simply drawn or stamped into a one piece container body although the seamed construction described is widely used. To complete the container description, bail lugs or trunnions are crimped into place on diametrically opposite positions on the container. Generally, the trunnions are cup shaped stampings with a peripheral flange formed on the rim of the cup. Typically, the sheet metal, prior to rolling into a cylinder, is stamped by a series of dies to form two indentations which will be diametrically opposite one another after the sheet metal is rolled into a cylinder. The bail lugs are then placed into the indentation and the indentation edges crimped over the bail lug's flanges to secure the lugs to the container body prior to rolling.

Paint containers of the type described have proven acceptable for their intended function and use. There are, however, a number of drawbacks which are principally centered about or arise because of the ring and plug construction described.

From the viewpoint of a can manufacturer, the ring is an unnecessary appendage which, if removed, would materially simplify the container. That is the container could be manufactured with less metal. The container could also be manufactured quicker and more easily because making the ring and then seaming the ring to the container's side wall opening would not be required. Thus, if the ring could be eliminated, the cost of the container would materially decrease.

From the consumer's viewpoint, the ring is undesirable because, despite several patents concepts to the contrary, the ring collects paint and prevents the container from being resealed in an air-tight manner. The ring also inhibits the ability of the user to pour the contents of the container. The ring also prevents all the contents of the container from being emptied.

A less obvious drawback of the plug-ring design is that stacking or nesting of the containers, one on top of the other, cannot occur with conventional designs. Stacking is important from both a shipping and dealer inventory standpoint. Such a feature is simply not readily available with conventional designs because the ring sealing grooves interfere with or prevent the formation of a plug or lid which can function as an interlocking member.

Within the container art, the ring is viewed as a necessary evil which is required to meet the stringent requirements of the paint industry so that, at least initially, an air-tight, shock resistant seal is achieved for the container body. Inherent in the ring-plug seal approach is the elimination of any problems which might otherwise result in attempting to seal, in a repeatable manner, a soldered seam. That is the container is rolled and maintained in a cylindrical shape by a longitudinal soldered seam which extends the entire length of the container. More precisely, each longitudinal end of the container is formed as "U" and the ends are interlocked, crimped and soldered. The soldered seam is thus four times the thickness of the metal. By crimping the ring to the open end of the container and over the soldered seam permits the plug to be sealed within seamless grooves formed in the ring. The ring-plug seal is taught in the container art as being effective because the multiplicity of sealing surfaces. In practice, it is believed that the ring-plug closure initially operates as a seal because i) there is no soldered seam to seal and ii) an interference fit is established between the ring and the plug. That is, as the plug is wedged into the ring, various interference fits are formed by opposing wedge angles between the plug and ring which permanently deform the metal so that the lid is prevented from popping off when the container is dropped. Inherently, the effectiveness of the interference fit is diminished once the plug is removed from and then reapplied to the ring since the metal has already undergone a plastic deformation.

The prior art has long recognized the drawbacks attributed to plug-ring containers, and have developed numerous ringless designs principally to achieve a curled mouth opening in the container for enhanced pourability. U.S. Pat. Nos. 1,419,314 to Sexton and 2,060,504 to Kjellstrom are examples of early ringless paint container designs. Ringless non-paint container designs which are made from plastic, not sheet metal (to which the present invention relates) include U.S. Pat. Nos. 3,056,525 to Deinert and 3,732,909 to Rooke et al and are cited to simply show various locking closures, in plastic, which have certain sealing attributes. A paint container of a conventional sheet metal design which is not entirely dissimilar to that of the parent invention is shown in U.S. Pat. No. 3,333,728 to Burdick. Also, a hybrid design in the sense that a ring is employed with a curled opening is disclosed in U.S. Pat. No. 1,997,291 to Barroll. The Barroll concept, in various forms but always using a ring, is in use today on rectangular or oblong metal containers.

The ringless designs, despite the many claims and assertions made, are not suitable for today's paint containers. For one thing, today's paint containers are dimensionally standardized (within limits). Any newly designed can to be commercially successful must be compatible with existing manufacturing equipment and more importantly, with existing filling facilities. Secondly, the test standards for today's paint containers are stringent. Unique to paint container applications is the force developed within the container at various areas about the inside of the lid from the paint or fluid within the container which acts to pry the lid off when the paint container is dropped or when the container is impacted on its side such as when it enters a labelling machine or a shaker or is otherwise subjected to overall general abuse. In general, the uneven forces act to loosen the lid on the prior art ringless container design and break the air-tight seal which was initially established when the lid was applied to the container. This principally results because there are only two annular seal areas in such designs and this results in an insufficient interference fit when contrasted to that fit established in the ring-plug closure. Additionally, when the lid must snap over a soldered beam which extends to the mouth of the container, the sealing of the container becomes especially difficult. Further, today's paint industry has developed other tests besides the shock test which prior art container designs were not subjected to at the time of their development and which, it is believed, would not be met by such containers today.

In summary of the ringless metal container prior art, it would appear from the art considered that it is recognized that something must be done to rigidize or strengthen the curled bead opening while also providing some mechanisms for removing the lid. Thus, in Ullman U.S. Pat. No. 3,170,590 and Kenny U.S. Pat. No. 1,954,568, the side wall of the containers are rigidized. In Ullman, a bead in the shape of a truncated cone is formed in the side wall and in Kenny a gradually shaped reverse curve is formed in the side wall. Ullman's side wall bead presents an objectionable protrusion whereas Kenny's configuration provides no easy pry for the lid. Burdick U.S. Pat. No. 3,333,728 provides a sharp V-shaped groove in the side wall which rigidizes the mouth while also providing a pry point, and Burdick's container has been commercially used as shoe polish container. The V-shaped protrusion is not acceptable for the paint can application of the present invention since it cannot be easily formed or easily formed without distorting the thickness of the metal. New Zealand Application 170,523 published Nov. 7, 1974 also provides a pry point in a ringless container but, unlike the other prior art cited, uses a mouth configuration which seriously weakens the container.

SUMMARY OF THE INVENTION

It is thus a principal object of the invention to provide a ringless container with a resealable lid which is suitable for use as a metal paint container.

This object along with other features of the invention is achieved by means of a cylindrical container in combination with a removable resealable lid. The lid comprises a generally flat base having a generally circular periphery and at least one annular sealing groove formed adjacent its peripheral edge. The lid's sealing groove is defined by longitudinally-extending inner and outer sealing walls with a bight wall therebetween thus forming an inverted U-shaped groove. The container has a generally cylindrical, longitudinally-extending side wall with a circular bottom wall at one end of the side wall and a generally circular open end at the opposite end of the side wall. More specifically, the container's side wall has a configured rim portion adjacent its open end and a generally cylindrical body portion extending from its bottom end to the rim portion. The rim side wall portion is adapted to sealing receive the lid for closing the open end of the container and includes i) the top end of the side wall curled into a circular bead for sealingly engaging the sealing groove of the lid and ii) a radially deflectable means adjacent the bead which permits resilient movement of the container side wall to maintain the bead in sealing engagement with the lid's inner and outer seal walls should there be a shock imparted to the container.

In accordance with a more specific feature of the invention, the rim portion of the container's side wall has a longitudinally-extending sealing segment generally parallel to the body portion of the container's side wall and adjacent to and depending from the curled bead. The sealing segment is positioned radially inwardly from the body portion of the container and a transversely extending wall segment depends from the sealing segment to the body portion of the container. The radially inward sealing segment is adapted to be in contact substantially along its total length with the inner seal of the lid to define a rather large, longitudinally-extending, substantially air-right frictional sealing area between the lid and the container with the transversely extending frusto-conical segment of the rim portion being somewhat flexible to assist in the maintenance of the seal in response to movement of the fluid within the container against the inner surface of the lid.

In accordance with another aspect of the invention, rigidizing means is provided in the rim portion of the container to resist longitudinal deflection of the curled circular bead when the lid is applied to the container or should the container be dropped on its lid. The rigidizing means includes at least a first pair of reverse bends formed in the transverse segment adjacent the body portion of the container's side wall which thus forms a first protrusion in the transverse segment and a second pair of reverse bends formed in the transverse segment which forms a second protrusion. The first protrusion also functions as a stop or guide means for locating the label applied to the body portion of the container. The second protrusion also provides a stop against which a bladed object can be inserted between the lid and the container to pry the lid off the container.

In accordance with another aspect of the invention, the flat portion of the lid or plug is flexible in response to the movement of the fluid to maintain, in cooperation with flexure of the body side wall portions of the container (which includes the rim portion) the aforedescribed seal surfaces in proper relation to one another.

Another feature of the invention resides in the overall dimensional relationship between the container and the lid. More specifically, the bead formed at the juncture of the bottom end of the container's cylindrical wall with the bottom wall of the container has a radial dimension or diameter equal to that of the first protrusion. The second protrusion has a lesser diameter and the outside diameter of the lid is not greater than the diameter of the bottom seam or the first protrusion. The result of sizing the container in accordance with such relationships assures that the container will roll in a straight line on its side so that paper and paper type labels can be applied to the container by rolling the container within the guides in conventional labelling machines.

Yet another feature of the invention resides in the formation of a slight recess in the bottom wall of the container which extends into the container's opening. This recess is sized to be slightly larger in diameter than that of the outermost annular wall of the U-shaped sealing groove formed in the lid. The lid of the container is constructed such that the inverted U-shaped groove extends above the base portion of the lid. Thus, the containers can be nested, one on top of the other (with or without the lids attached), by a recess having a small depth which acts substantially over an area approximately equal to the diameter of the container to securely stack the containers in a positively interlocked manner.

In accordance with yet another aspect of the invention, the deleterious effects of the side wall seam on the seal between the lid and the rim portion of the container are minimized by resistance welding the longitudinal side wall ends to one another with an extremely small overlap therebetween thus minimizing any bulge in the rim portion of the container.

In accordance with yet another more specific feature of the invention, the cup shaped trunnions or bale lugs are formed with diametrically opposed tab portions extending from the cup's rim which are simply resistance welded to the container's side wall to avoid the multi-step die operations previously required to apply such lugs as described above. Importantly, the tabs are positioned parallel to the longitudinal centerline of the container to permit the container to be rolled into its cylindrical shape.

Yet another specific feature of the invention relates to the fact that the rim portion of the container is formed only by bending and rolling the container so that the sheet metal of the rim portion is not elongated or reduced in area such as that which might occur if the container were formed by a drawing operation thus insuring the desired resilient characteristics of the rim portion and dimensional accuracy thereof. Further to this feature of the invention the sheet metal gauge of the container is selected to assure the desired resiliency of the rim portion of the container. The overall diametrical relationship between the annular sealing groove formed in the lid and the circular curled sealing bead formed in the lid and the circular curled sealing bead formed in the container's rim portion is such that at a "rest" or unassembled position, one has a slightly larger dimension than the other to assure sealing of the rim portion of the container when the lid is snapped in place thus affecting a seal at and adjacent the container side wall seam by the resilience of the curved circular bead. Because there is not a significant plastic deformation of the metal when the lid is applied, the lid can be constantly reapplied to the container with the consistently good seals.

In accordance with a specific feature of this invention, the rigidizing means in the rim portion of the container includes only a single reverse bend formed in the frusto-conical wall segment adjacent the body portion of the side wall with the first bend sharper than the second bend to form a relatively sharp protrusion in the shape of an annular groove whereby the rim portion can be readily formed while the rim portion is maintained sufficiently rigid such that the container can function as a paint can or like container.

It is thus another object of the invention to provide a ringless container-lid design while providing for a lid-container seal which is an improvement over the prior art.

Another object of the invention is to provide a container which meets all the dimensional requirements of standardized paint containers but is an improvement over conventional containers.

It is yet another object of the invention to provide a container-lid design which permits the containers to be stacked one on top of the other in a nested arrangement.

A still further object of the invention is to provide a metal ringless container which can be effectively sealed, in a repeatable manner, even though there is a seam in the open end of the container.

Yet another object of the invention is to provide a ringless container-lid design which is constructed to insure that the container rolls flat when placed on its side with or without the lid secured thereto.

Yet another object of the invention is to provide an improved container with a simplified arrangement for securing the wire handles thereto.

Still another object of the invention is to provide a new container-lid design which can utilize existing, conventional machinery to fill the container, seal the lid to the container and wrap the labels around the container's side wall.

Another object of the invention is to provide a metal, ringless container which has a rigidized mouth portion that can be easily formed while providing for prying of the lid therefrom to open the container.

A still further object of the invention is to provide an improved ringless metal container.

These and other objects, features and advantages of the invention will become apparent from the following description of species thereof taken together with the accompanying drawings.

BRIEF DESCRIPTION OF THE DRAWINGS

The invention may take physical form in certain parts and arrangement of parts, a preferred embodiment of which will be described in detail and illustrated in the accompanying drawings which form a part hereof and wherein.

DETAILED DESCRIPTION OF THE PREFERRED EMBODIMENT

Figure 1:
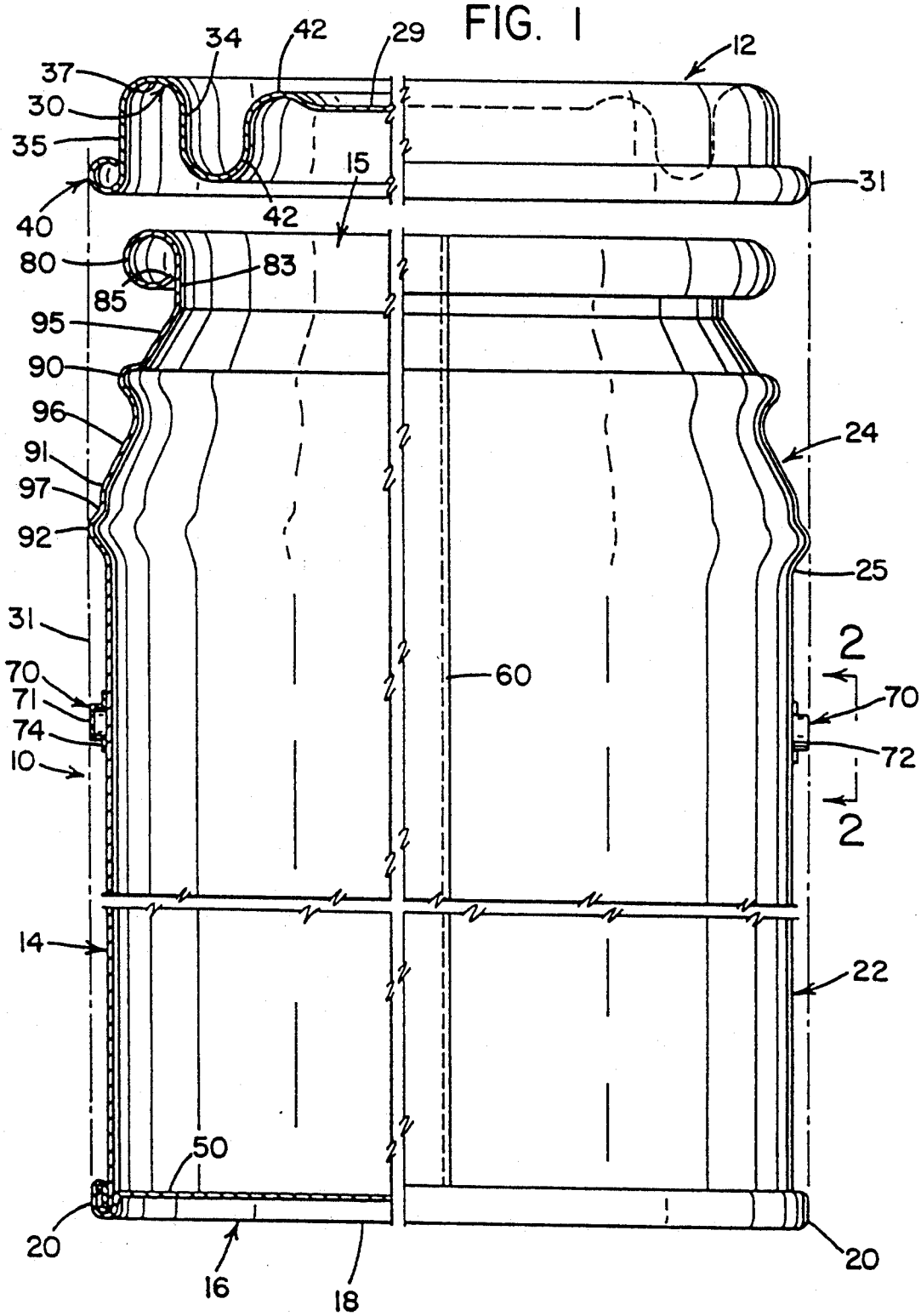
FIG. 1 is a sectioned schematic illustration of the lid and the ringless container of the present invention.

Referring now to the drawings where the showings are for the purpose of illustrating a preferred embodiment of the invention only and not for the purpose of limiting same (except with respect to the FIG. 3a embodiment), FIG. 1 shows a sectioned schematic illustration of a ringless container 10 and a lid 12 adapted to be secured to container 10. Container 10 and lid 12 are manufactured from tin coated sheet metal which is tempered at various temperatures and cycles to give desired physical properties. In the paint industry, the gauge of the metal is specified in pounds and container are typically constructed form metal having gauges of 65 to 110 lbs, with heavier gauges used in larger containers and lighter gauges for smaller containers. For the one gallon container illustrated in the preferred embodiment the gauge is 85 lbs. This gauge exhibits good resilience for the sealing characteristics of the present invention.

Container 10 includes a side wall 14 having an open end 15 and a closed end 16 defined by a bottom wall 18 secured by means of a conventional double seal 20 to closed end 16 of side wall 14. For purposes of explanation, side wall 14 may be further defined as comprising cylindrical body portion 22 and a frusto-conical rim portion 24. Cylindrical body portion 22 begins at closed end 16 of side wall 14 and terminates at the beginning 25 of frusto-conical rim portion 24 which in turn terminates at open end 15 of side wall 14.

Figure 4:
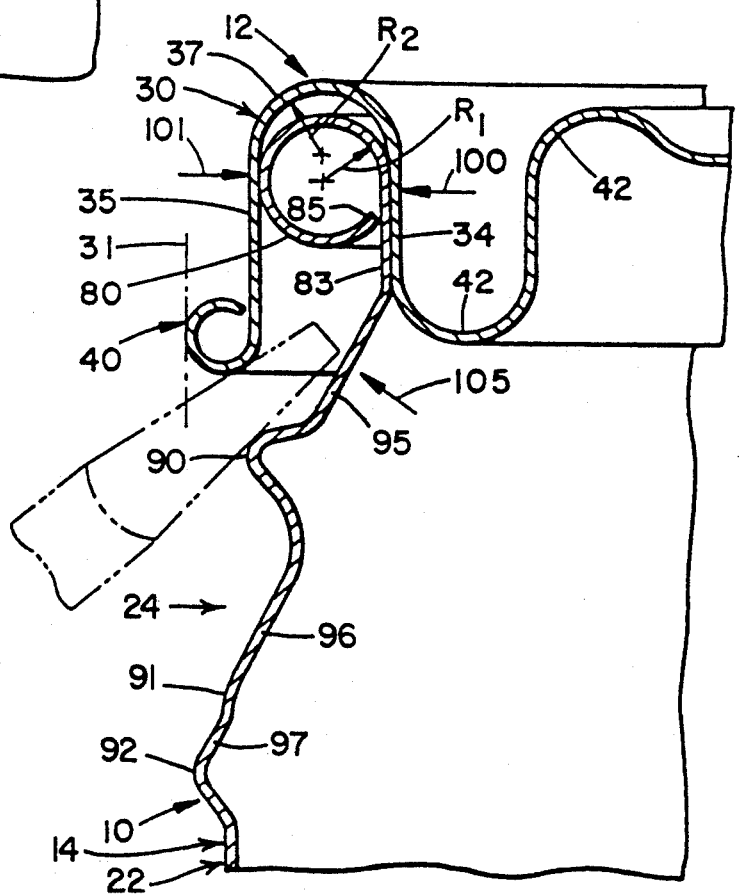
FIG. 4 is a view similar to FIG. 2 but showing the lid secured in place on the container.

Referring now to FIGS. 1 and 4, lid 12 is a generally circular plate pressed into the configuration of that illustrated by an appropriate die. More specifically, lid 12 has a generally flat base portion 29 and an annular sealing groove 30 formed adjacent to the peripheral edge 31 of lid 12. Sealing groove 30 is more particularly defined by a longitudinally-extending inner sealing wall 34 and a longitudinally-extending outer sealing wall 35 with a curved bight wall 37 connecting inner and outer sealing walls 34, 35. Bight wall 37 is formed with a predetermined radius of configuration designated as $R_2$ which will be explained in greater detail hereafter. It should be noted that inner sealing wall 34, bight wall 37 and outer sealing wall 35 form an inverted U-shaped groove. The peripheral edge 31 of lid 12 is curled to form a bead 40 which functions as a pry point for removing lid 12 form container 10. As shown, peripheral edge 31 of lid bead 40 is also in longitudinal alignment with the outer edge of bottom double seam 20 and, importantly, bead 40 is curled inwardly to permit container 10 with lid 12 applied to roll in a straight line for purposes of applying paper labels to filled containers 10 by means of conventional label machines. Adjacent sealing groove 30 is a rigidized groove 42. Several rigidizing grooves 42 can be provided in lid 12 so that the generally flat base portion 29 of lid 12 is rigidized. Preferably, only one rigidizing groove 42 is provided to permit some flexibility in lid 12.

Referring further to FIG. 1, bottom wall 18 is recessed, typically ⅛", adjacent double seam 20 to define an annular seating wall 50 which importantly has a diameter approximately equal to the internal diameter of cylindrical body portion 22 of container 10. The dimensional sizing of the diameter of seating wall 50 and the diameter of outer sealing wall 35 of lid 12 is such that lid 12 closely fits into bottom plate 18 of a stacked container. The relatively large circumferential area of seating wall 50 provides a good retention area to maintain container 10 serially stacked, one on top of the other, than that which would otherwise necessarily occur if a smaller diameter seating wall were employed. A significantly smaller diameter seating area would occur, for example, if a conventional plug-ring container was modified to achieve a similar recess for stacking purposes.

Side wall 14 is rolled, not drawn, into the cylindrical and frusto-conical configuration shown in FIG. 1 from a rectangular sheet metal plate. The longitudinally-extending ends of the flat plate are joined together into a longitudinal seam 60 (shown in FIG. 1) which extends from bottom wall 18 through open end 15 of container 10. In conventional can making processes, the longitudinally-extending ends of the rectangular plate are reversely crimped to form U-shaped longitudinally-extending ends which are then interlocked when the plate is formed into a cylinder, crimped and soldered. Thus a soldered seam has a thickness four times that of the container's side wall. In accordance with the present invention the longitudinal seam is resistance welded by simply overlapping the longitudinal ends of the rectangular place one on top of the other. Importantly, the overlap is closely controlled to a minimum value, not in excess of 0.4 mm. When the overlap edges are resistance welded, the thickness of the welded joint is controlled to be less than twice the thickness of the container's side wall's metal, preferably about one and a half times the thickness. Thus a longitudinal seam of only about 0.4 mm is formed and the longitudinal seam is only about one and a half times the metal thickness thus causing little disruption from a sealing consideration.

Figure 2:
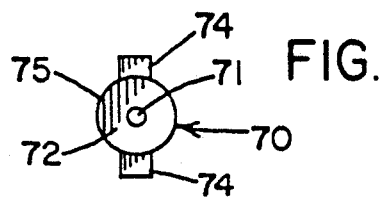
FIG. 2 is a view of the bail trunnion taken along line 2—2 of FIG. 1.

Two bale trunnions 70 are provided at diametrically opposite positions on the cylindrical body portion 22 of side wall 14 into which the ends of a wire handle (not shown) are inserted in a conventional manner for carrying container 10. The trunnions or bale lugs 70 (FIG. 2) are formed into a cup shaped configuration with an opening 71 in the base 72 for the ends of the wire handle and a pair of diametrically opposed tabs 74 is formed at the rim 75 of cup shaped trunnion 70. Tabs 74 are then resistance welded to side wall 14 of container 10 thus fixing trunnion 70 to side wall 14. Importantly, tabs 74 are positioned to extend in a longitudinal direction parallel to the longitudinal ends of the plate which is rolled into cylindrical side wall 14. Also, the widths of tabs 74 are controlled as well as the thickness to prevent interfering with the rolling operation of side wall 14. That is, if tabs 74 were not orientated as specified trunnions 70 would pull apart from side wall 14 or dent side wall 14 during the rolling operation. This does not occur in the prior art because of the looseness residing in the crimped joint formed in side wall 14 and trunnion 70. Side wall 14 may be slightly indented in the area where trunnions 70 are resistance welded thereto so that the cupped portion of trunnion 70 does not extend beyond the diameter of double seam 20. However, this is not necessary for labelling purposes since only the ends of container 10 are required to roll straight.

Figure 3:
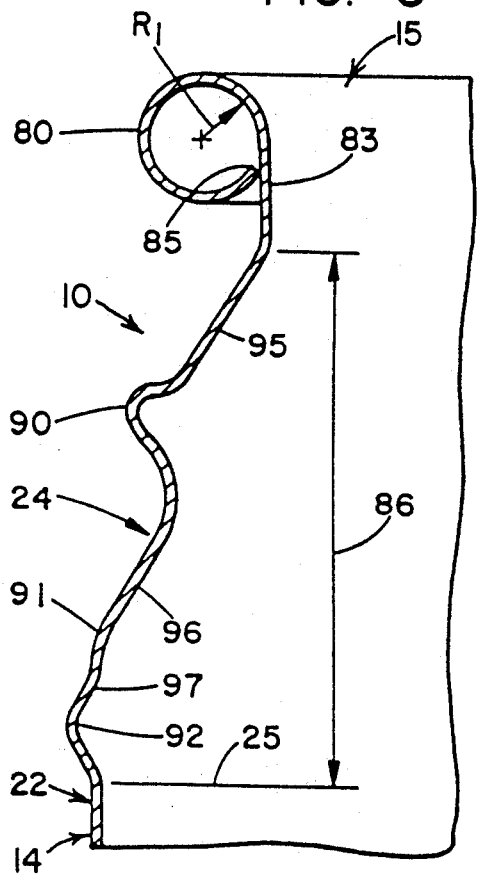
FIG. 3 is an expanded view showing the cross-section of the rim portion of the container of the present invention.
Figure 3A:
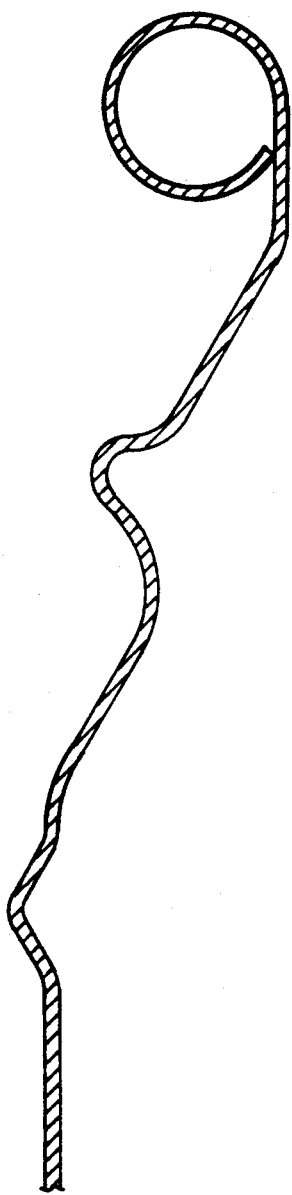
FIG. 3a is a view similar to FIG. 3 but showing the dimensional relationship for the rim portion of a one gallon cylindrical container of the present invention.

Frusto-conical rim portion 24 is disclosed in FIG. 3 and disclosed in FIG. 3a are the actual dimensions of a frusto-conical rim portion 24 for a one gallon cylindrical container 10 which has been successfully built and tested. It is believed that the dimensions would be similarly down sized for smaller container such as pints or quart cans and uniformly increased for larger sized containers and that the relationships between the specified dimensions are necessary for the unique functioning of the container-lid seal. In any scaling up or down of the dimensions, it is contemplated that some variations of the dimensional relationship of up to about 10 percent (10%) is permitted. This is to compensate for changes in the sheet metal gauge for different sized containers and other factors.

Referring now to FIG. 3, open end 15 of side wall 14 is curled into a circular bead 80 of a predetermined radius $R_1$. Depending from circular bead 80 is a longitudinally-extending sealing segment 83 which is parallel to cylindrical body portion 22 and positioned radially inwardly therefrom a predetermined distance. Circular bead 80 is curled in the direction shown with its free end 85 positioned against the outside surface of sealing segment 83 to permit movement or flexure of circular bead 80 when annular sealing groove 30 is wedged into sealing engagement with circular bead 80 and sealing segment 83. A generally frusto-conical, transverse segment 86 depends from sealing segment 83 and extends to the end of cylindrical body portion 22 the juncture therewith designated as line 25. Transverse segment 86 along with the flexing of cylindrical body portion 22 provides the radially deflectable means to permit the seal between circular bead 80 and sealing groove 30 to be maintained in the event of the container being subjected to shock loading. The flexibility of rim portion 24 is a function among other things of the angular relationship between transfer segment 86 and sealing segment 83 and cylindrical body portion 22. Good results have been achieved with an angular relationship of about 30° although various variations will be apparent to those skilled in the art. It should also be noted that this angle over the distance of transverse segment 86 is sized to permit the stacking concept defined above.

Significantly increasing the frusto-conical angle can result in a longitudinal downwardly deformation of rim portion 24 when lid 12 is applied over circular bead 80. To strengthen rim portion 24 against such longitudinal deformation three upsets or protrusions 90, 91 and 92 are provided in transverse segment 86. It is believed that at least two such protrusions must be provided. In between protrusions 90, 91, 92 are frusto-conical portions 95, 96, 97, respectively, of transverse segment 86 and frusto-conical portions 95, 96, 97 are essentially parallel to one another to maintain the desired 30° flex relationship shown. First protrusion 90 does not extend a diametrical distance greater than that of the third protrusion 92 and functions as a pry point for a bladed tool to be inserted between rim portion 24 and bead 40 of lid 12 so that lid 12 can be removed from container 10. Third protrusion 92 also functions as a stop or a guide for the edge of the label applied to cylindrical body portion 22. Third protrusion 92 also has a diametrical distance approximately equal to that of double seam 20 to permit container 10 to be rolled in a straight line so that labels can be applied to cylindrical body portion 22 with conventional label applying machinery when lids 12 are not applied. Protrusions 90-92 rigidize transverse segment 86 against longitudinal deflection when a force is applied to lid 12 to fasten lid 12 to container 10 in a sealing manner.

FIG. 4 shows lid 12 applied to container 10. Preferably in an unassembled or "free" condition, radius $R_1$ of circular bead 80 is equal to or slightly greater than the distance $R_2$ which is the distance between inner sealing wall 34 and outer sealing wall 35 of sealing groove 30 of lid 12 so that an appropriate interference fit is formed.

Also in an unassembled condition, the diameter of lid 12 from the center of bight wall 37 (i.e., center of radius $R_2$) is equal to or slightly smaller than the free standing diametrical distance from the center circular bead 80 (i.e., center of radius $R_1$). Preferably the diametrical differences are about 0.009". When lid 12 is applied over circular bead 80 free end 85 of circular bead 80 tends to move into a tighter curled position while transverse segment 86 of rim portion 24 is biased slightly outwardly. There is thus established a very right interference fit between sealing segment 83 of rim portion 24 and inner sealing wall 34 along the entire length thereof and a small area contact (almost a line contact) between outer sealing wall 35 and circular bead 80. In this manner the adverse effects of side wall seam 60 which extends about circular bead 80 to form an indentation therein which heretofore prevented air-tight sealing of ringless container lids is overcome or compensated by resilient flexing of circular bead 80 as lid 12 is fastened thereto. A conventional sealant can be applied between the top of circular bead 80 and bight wall 37 of lid 12 should the container be filled with extremely liquid or watery substances such as stains and the like.

The prior art ringless paint container designs noted above provide some structural modification to rigidize the rim portion of the container against a lateral or radial direction. In U.S. Pat. No. 1,419,314 to Sexton and U.S. Pat. No. 2,060,504 to Kjellstrom the rim itself is bent over to form a U-shaped mouth with the legs extending a distance coupled with the bight wall sufficient to form a rigid mouth. In Burdick, the opening is curled in a bead as in the present invention. However, the container side wall, just below the curled opening is severely crimped or bent over onto itself to rigidize the mouth while also rigidizing the container side wall. In effect, the prior art ringless containers modified the rim portion of the container to rigidize the container's mouth and thus compensate for the rigidity of the ring which was eliminated in the design.

In contrast, the present invention's side wall and the rim portion is not rigidized. While the precise interaction between lid 12 and container 10 may not be fully understood, drop tests where the container has been dropped on its bottom wall 18 or on the edge of its bottom wall 18 have shown that the design disclosed provides better retention characteristics of lid 12 than that of conventional plug-ring devices or that certainly of prior art ringless design containers. Further, the improved sealing forces experienced in the drop tests continued to exhibit themselves until side wall 22 was physically damaged to the point where rim portion 24 became permanently distorted. This sealing characteristic is believed to only be attributed, secondarily, to a function of the interference fit between lid 12 and rim portion 24. In contrast the interference fit is believed to be of primary significance to the air-pressurized, lid pop-off test and in the end analysis, is limited to a force which can be overcome easily by the user who must remove and reapply lid 12.

It is believed that when the container is subjected to such shock loading, the paint or liquid inside the container exerts an off center force about a discrete area on the inside of lid 12, the exact area determined by the position of the can on impact. This force is simultaneously transferred about a discrete portion of transverse segment 86. It is believed that the shock is thus dissipated in good part by the deflection of transverse segment 86 along with a deflection of cylindrical body portion 22 and a deflection of generally flat base portion 29 of lid 12 before its upward prying vector component is sufficient to release the seal established by the interference fit between annular sealing groove 30 with circular bead 80. More specifically, the interference fit established between lid 12 and circular bead 80 establishes a force 100 which is normal to inner sealing wall 34 and sealing segment 83 and force 101 over a line or small area contact between outer sealing wall 35 and circular bead 80. Normal forces 100 and 101 establish a frictional force which must be overcome to unseat lid 12. When container 10 is dropped on its edge, the force of the liquid illustrated generally by vector 105 is transmitted in part to transverse segment 86 which tends to flex or distort thus absorbing or dissipating some portion of liquid force 105 which would otherwise act to pry off lid 12. At the same time, the deflection of transverse segment 86 does not adversely act to unseat the interference fit forces 100 and 101 established between circular bead 80 and sealing groove 30. This is an entirely different action and reaction which occurs in the conventional interference fit established in a plug-ring structure. Prior art ringless designs do not utilize a flexible rim concept to maintain the seal. While the flexibility of the container design of the present invention cannot be quantified, it is inherent in the design. Thus the gauge of the sheet metal could be increased as well as the interference fit between lid 12 and rim portion 24 and transverse segment 86 even straightened (thus preventing stacking and rolling of container 10) and the design disclosed will still have some flexibility in side wall 22 and lid 12 to enhance the sealing characteristics.

Also affecting the seal arrangement of the present invention is the longitudinally-extending side wall seam inherently present in the invention. As indicated above, if the container was attempted to be drawn into its present configuration without a longitudinal side seam, rim portion 24 could not accurately be drawn within its tolerance. Thus a longitudinally-extending side seam is required. If side seam is a conventional soldered side seam, its thickness, which would amount to 4 times the wall thickness, would adversely affect sealing of circular bead 80 and prevent rolling of the rim portion 24 into its desired configuration. Thus, the side seam is resistance welded with a closely controlled overlapped on no more than about 0.04" to produce a seam when welded of approximately 1½ times the wall thickness extending no more than 0.04 mm. Rim portion 24 is then rolled, in several steps, into its present configuration to maintain its thickness substantially throughout. Specifically, necking of rim portion 24 is avoided because of inability to hold dimensional tolerances and reduction of an a consequent weakening in the wall thickness. It is thus believed that by using a resistance welded longitudinally-extending side seam, closely controlled with a minimal overlap, and a rolled as opposed to a drawn or necked rim portion 24, an acceptable seal can be effected with no adverse consequences attributed to the resistance welded longitudinally-extending side seam.

Figure 5:
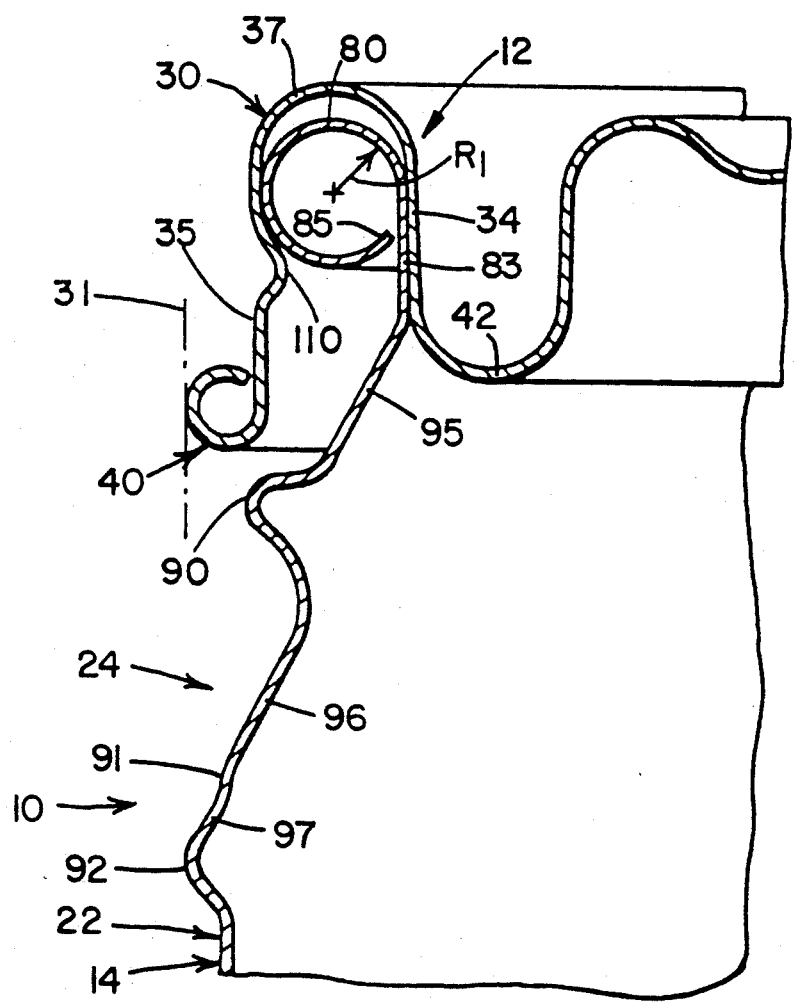
FIG. 5 shows a modification to the preferred embodiment of the invention.

An alternative embodiment is disclosed in FIG. 5 and like numbers will identify like parts where possible. The alternative embodiment includes forming a radially inwardly projecting groove or locking indentation 110 in outer annular wall 35 of lid 12. The remaining geometry of container 10 and lid 12 remains the same. As shown, locking indentation 110 engages circular bead 80 below the center of its arc $R_1$ to provide a snapping, positive seating engagement when lid 12 is sealed to container 10. In addition, the sealing area between outer annular wall 35 and circular bead 80 is increased. Thus a tighter seal is provided for in the later native embodiment of FIG. 5 than that of the preferred embodiment. FIG. 5 is shown as an alternative embodiment because it requires an additional die or an additional rolling step to be performed in the manufacturing process which is not believed necessary for most applications. However, for certain thick wall containers, say five gallon containers and the like or where the adverse effects of the longitudinally welded side seam becomes significant, the FIG. 5 embodiment may be utilized.

Figure 6:
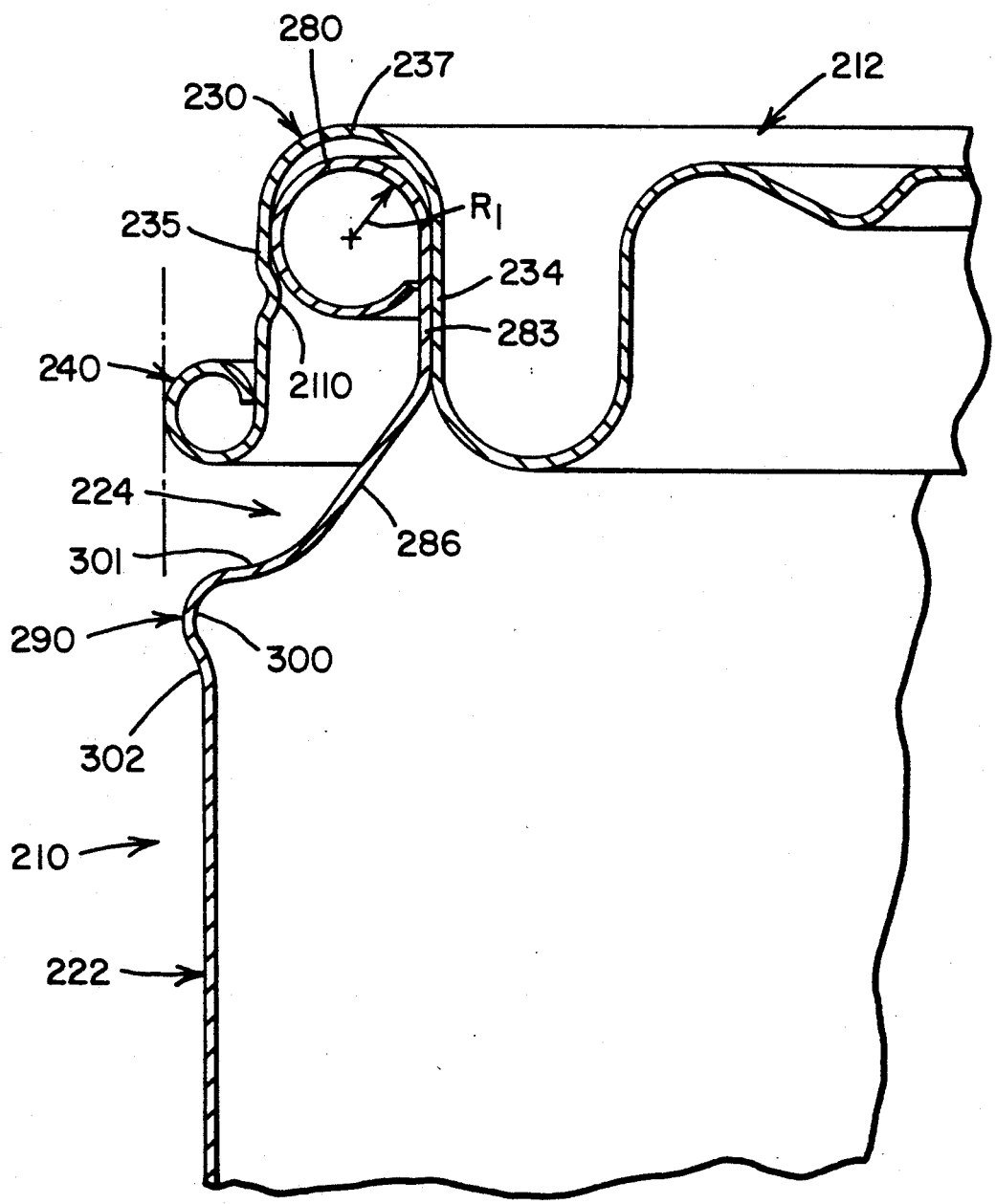
FIG. 6 is a view similar to FIGS. 4 and 5 but showing the container profile which forms the basis of this continuation-in-part invention.
Figure 7:
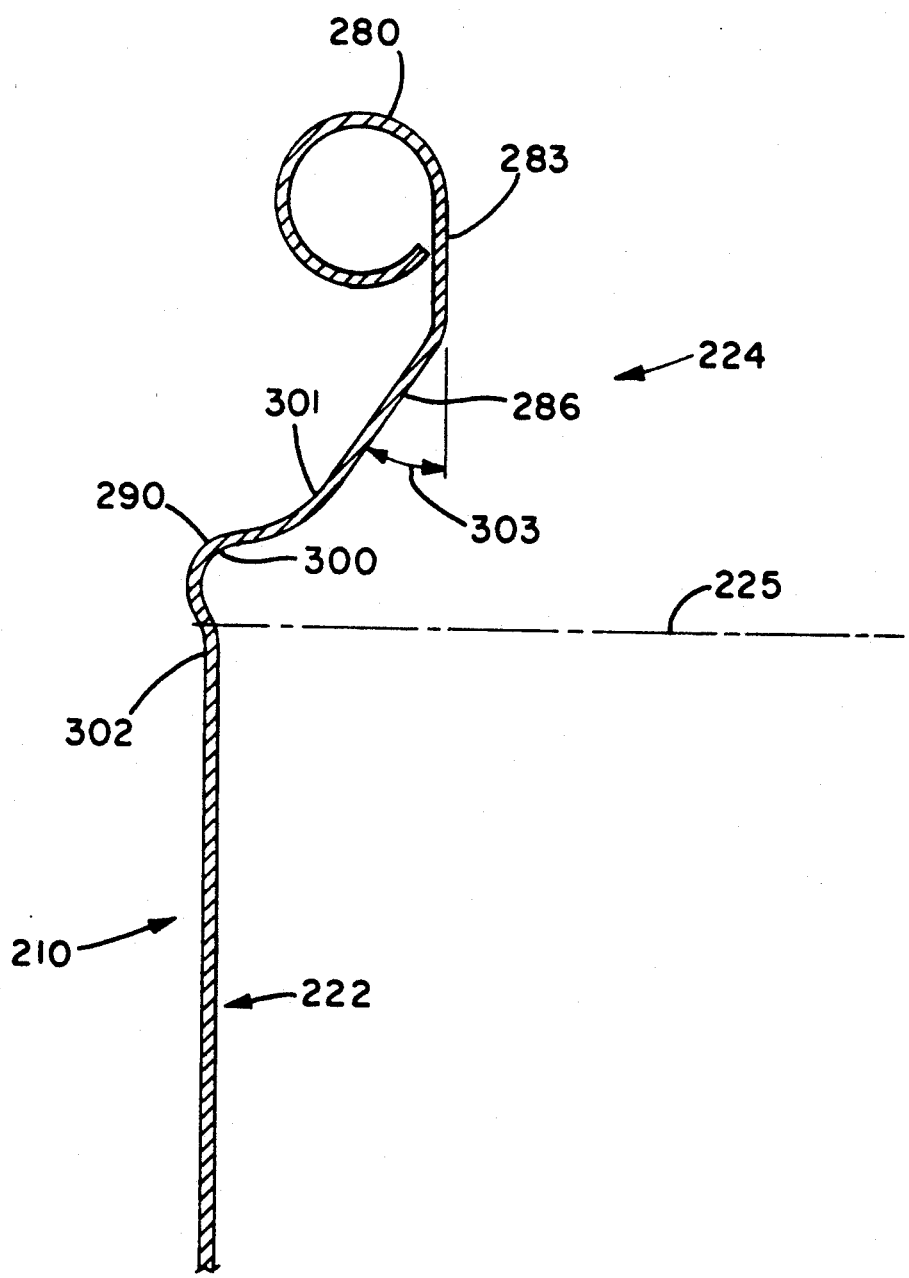
FIG. 7 is a view similar to FIG. 3a showing the dimensional relationships for the container profile of a one gallon paint container which is illustrated in FIG. 6.

Referring now to FIGS. 6 and 7, the same reference numerals used in explaining various parts and portions of the container-lid in FIGS. 1–4 will be used to explain the invention shown in FIGS. 6 and 7, but the reference numerals of FIGS. 1–5 when used in FIGS. 6 and 7 will be preceded by the number 2. Thus, frusto-conical rim portion designed as 24 in FIGS. 1–5 will be identified by reference numeral 224 in FIGS. 6 and 7.

The lid 121 shown in FIG. 6 is for all intents and purposes identical to that shown in FIG. 5 and has an annular sealing groove 230 defined by a longitudinally-extending inner sealing wall 234, a longitudinally-extending outer sealing wall 235 and a curved bight wall 237 connecting inner and outer sealing walls 234, 235. An indentation 2110 is provided in outer sealing wall 235 to permit lid 212 to snap over bead 280 when the lid is applied to the container as shown in FIG. 6. The position of indentation 2110 on outer sealing wall 235 must be such that it extends beyond the midpoint or radius $R_1$ of bead 280 when the lid is applied to the container. The dimensioning of lid 212 as well as bead 280 is identical to that disclosed in FIGS. 1–5 and the same interference fit between groove 230 and bead 280 exists such that the open edge of bead 280 curls or moves in a circular fashion as lid 212 is plied over bead 280. Referring now to FIGS. 6 and 7, the dimensions shown for FIG. 7 of the container profile is for a one gallon container. Rim portion 224 includes circular bead 280 and depending therefrom is a longitudinally-extending sealing segment 283 which is parallel to cylindrical body portion 222 and positioned radially inwardly therefrom a predetermined distance. A generally frusto-conical, transverse segment 286 depends from sealing segment 283 and extends to the end of cylindrical body portion 222, the juncture therewith or line of demarcation between rim and body designated by dot-dash line 225. At the juncture 225 of frusto-conical segment 286 with side wall 222 is provided rigidizing means in the form of a single protrusion 290. This protrusion is a sharp annular groove formed as a reverse bend of two arcuate surfaces, specifically first arcuate surface 300 which blends into second arcuate surface 301. The first arcuate surface is struck from inside the can and is sharper or has a smaller radius as shown in FIG. 7 than second arcuate surface 301 which is defined by an arc struck from outside the container. A third arcuate surface 302 is optionally provided as a blend surface with side wall 222 at the line of demarcation 225 between rim portion 224 and the body portion of the container. The angle which frusto-conical segment 286 makes with side wall 222 and sealing segment 283 is shown in FIG. 7 as 303 and is 35°.

Comparing rim portion 224 of FIG. 7 with rim portion 24 as shown in FIG. 3a, the height of rim portion 224 of the container shown in FIG. 7 is significantly less than the height of rim portion 24 of the container shown in FIG. 3a. Since the container holds a fixed quantity of liquid, i.e. one gallon, the distance from demarcation line 225 to the bottom of the container for the container shown in FIG. 7 must be longer than the distance from demarcation line 25 to the bottom of the container shown in FIG. 3a. Since paper labels are conventionally applied to the body portion 222 of the container, longer length labels can be applied to the container shown in FIGS. 6 and 7 than that which can be applied to the container shown in FIGS. 1-5. In fact, the length of the rim portion of the can profile shown in FIGS. 6 and 7 is designed to provide a body length such that the same labels used on conventional ring type, one gallon cans can be used for the one gallon can shown in FIG. 7. The labels are applied at the paint manufactured's plant by rolling the container and thus no adjustment in conventional paint labelling equipment is required nor do new labels have to be made for the invention disclosed in FIGS. 6 and 7.

As noted above, it is critical the rigidity of rim portion 224 that the configuration be formed without significantly reducing the wall thickness of the metal. If there are many bends in rim portion 224 the tendency to reduce the wall thickness is increased. Further, since the bends are somewhat sequentially formed, the throughput of the can manufacturing line is increased if rim portion 224 has fewer bends. On the other hand, the rigidity of rim portion 224 is less than that of the double protrusion frusto-conical wall shown in FIGS. 1-5. Nevertheless, drop tests conducted with the can profile shown in FIG. 7 have proven satisfactory. This was for a can body 210 formed from 85 lb (0.0094") tin plate stock and can lid 212 formed from 95 lb (0.0105") tin plate stock, which is typical stock used in lids and bodies of conventional one gallon ring type containers. Also, it is to be noted that the space between the lid bead 240 first protrusion 290 provides the same pry point for the invention disclosed in FIGS. 6 and 7 as that shown in FIG. 4.

Thus, a ringless can rim profile using a single protrusion 290, as defined, provides i) a label retaining lip for conventional labels, ii) a pry point position for removing lid 212, iii) a sufficient level of rigidity to rim portion 224 to adequately withstand vertical loads, and iv) an easily formable profile configuration enhancing throughput of the manufacturing line.

Having thus described the invention it is apparent that many modifications and alterations may be made thereto without departing from the spirit or essence of the invention. For example, the invention has been disclosed and explained with reference to cylindrical metal containers where the invention has particular uniqueness and application. However, and in concept, a scaled down rim and lid could be applied to a cylindrical opening formed in an oblong or "F" shaped container having a rectangular top. Furthermore, the invention has been described with reference to paint containers where it has particular application. However, the container is, of course, suitable for other applications such as coffee cans, peanut cans and the like where the resealable characteristics of the container and the stacking feature assume significance. It is intended to include all such modifications and alterations insofar as they fall within the scope of the invention.

It is thus the essence of the invention to provide a ringless container in combination with a removable, resealable lid which uses an especially configured rim opening to provide an effective lid-container seal.

Having thus defined the invention, the following is claimed:

1. A wide-mouth cylindrical, rolled metal container having generally constant wall thickness in combination with a removable, resealable lid comprising:
  a. said lid having a generally circular configuration with an annular sealing groove formed adjacent its peripheral edge; said sealing groove defined by continuous longitudinally-extending inner and outer sealing walls with a bight wall therebetween thus forming an inverted, U-shaped groove;
  b. said container having a generally cylindrical, longitudinally-extending side wall of generally constant wall thickness, a circular bottom wall at one end of said side wall and a generally circular top opening at the other end of said side wall, said container side wall further defined by a configured rim portion adjacent said top end and a generally constant diameter cylindrical body portion extending from said bottom wall to said rim portion;
  c. said rim portion adapted to receive said lid for closing said top opening and further including i) said top end of said side wall curled in a bead for sealing engaging only said sealing walls of said lid, said outer sealing wall of said lid establishing approximately an annular line contact with said container's bead, said curled bead having an outside diametrical distance slightly less than the outside diametrical distance of said cylindrical body portion so that said container is a wide mouth container; ii) a longitudinally-extending sealing wall segment generally parallel to said container's side wall and positioned radially inwardly therefrom adjacent to and depending from said curled bead and adapted to be in area contact over a substantial portion of the length thereof with said lid's inner sealing wall to define a longitudinally-extending, frictional sealing wall segment, said sealing walls compressing said curled bead, and iii) a straight frusto-conical wall segment extending from said sealing segment to said container's side wall and having a single reverse bend formed in said frusto-conical wall segment adjacent said body portion of said side wall, said single reverse bend having a first arcuate bend portion contiguous with a second arcuate bend portion, said first bend portion sharper than said second bend portion to form a relatively sharp protrusion in the shape of an annular groove, said second bend portion blending into said frusto-conical wall segment and said first bend portion terminating at the line of demarcation between said rim portion and said cylindrical body portion.

2. The container of claim 1 wherein said frusto-conical wall segment first bend portion of said single reverse bend is an arcuate surface defined by a first arc struck from the inside of said container and said second bend portion is an arcuate surface defined by a second arc struck from the outside of said container, said second arc larger than said first arc so that said protrusion functions as a dry point for removal of said lid and defines an edge abutting a conventional label applied to said body portion of said container.

3. The container of claim 2 wherein said outer sealing wall of said lid has an annular groove projecting radially inwardly formed therein; said groove formed a spaced longitudinal distance away from said bight portion which is at least greater than the radius of said bead in said container's rim portion so that said groove compresses and provides a second annular line contact with said container's bead whereby a positive, snapping action is provided when said lid is applied to said container.

4. The container of claim 3 wherein said frusto-conical wall forms an acute angle with said side wall of about 35°.

5. A cylindrical, wide-mouth rolled container having generally constant wall thickness in combination with a removable, resealable lid comprising:
   a) said lid having a generally circular configuration with an annular sealing groove formed therein, said sealing groove defined by longitudinally-extending inner and outer sealing walls with a bight wall therebetween forming an inverted, U-shaped groove;
   b) said container having a generally cylindrical longitudinally-extending side wall of generally constant wall thickness defined by a configured rim portion adjacent the end of said container and a generally cylindrical body portion contiguous with and extending from said rim portion towards the bottom of said container;
   c) said rim portion adapted to receive said lid for closing said opening and further including i) said top end having an outside diametrical distance slightly less than the outside diametrical distance of said cylindrical body portion of said side wall and curled in a bead for sealing engaging only said sealing walls of said lid, ii) a longitudinally-extending sealing wall segment generally parallel to said container's side wall depending from said curled bead and adapted to be in contact over a substantial portion of the length thereof with one of said lid's sealing walls, said sealing walls compressing said curled bead, and iii) a straight frusto-conical wall segment extending radially outwardly from said sealing segment to said side wall and having a reverse bend formed in said frusto-conical wall segment adjacent said body portion of said side wall, said reverse bend having a first bend portion sharper than said second bend portion to form a relatively sharp protrusion in the shape of an annular groove, said second bend portion blending into said frusto-conical wall segment and said first bend portion terminating at the line or demarcation between said rim portion and said cylindrical body portion whereby said rim portion is sufficiently strengthened to withstand vertical loads while retaining flexibility to maintain sealing characteristics of said lid with said bead.

6. The container of claim 5 wherein said outer sealing wall of said lid has an annular groove projecting radially inwardly formed therein; said groove formed a spaced longitudinal distance away from said bight portion which is at least greater than the radius of said bead in said container's rim portion so that said groove compresses and provides a second annular line contact with said container's bead whereby a positive, snapping action is provided when said lid is applied to said container.

* * * * *

UNITED STATES PATENT AND TRADEMARK OFFICE
CERTIFICATE OF CORRECTION

PATENT NO. : 5,240,138

DATED : August 31, 1993

INVENTOR(S) : Thomas A. Gallagher

It is certified that error appears in the above-indentified patent and that said Letters Patent is hereby corrected as shown below:

Column 1, Line 45, change "container" to "containers". In Column 2, Line 6, change "patents concepts" to "patented concepts". In Column 3, Line 37, change "mechanisms" to "mechanism". Column 7, Line 14, change "container" to "containers". In Column 7, Line 15, change "form" to "from". In Column 7, Line 20, change "resilience" to "resiliency". In Column 7, Line 48, change "form" to "from". In Column 11, Line 53, change "an" to "and". In Column 12, Line 3, change "later native" to "alternative". In Column 12, Line 15, change "FIGS. 1-4" to "FIGS. 1-5". In Column 12, Line 21, change "lid 121" to "lid 212". In Column 13, Line 15, change "manufactured's" to "manufacturer's".

Claim 2, Column 14, Line 61, change "dry point" to "pry point".

Signed and Sealed this

Nineteenth Day of April, 1994

Attest:

BRUCE LEHMAN

*Attesting Officer*     *Commissioner of Patents and Trademarks*